United States Patent [19]

Lobo et al.

[11] Patent Number: 4,931,900
[45] Date of Patent: Jun. 5, 1990

[54] DIELECTRIC FLUID FOR A METALLIZED FILM CAPACITOR

[75] Inventors: Edward M. Lobo, Shelton; Michael F. Berman, Ansonia, both of Conn.

[73] Assignee: Magnetek Universal Mfg., Corp., Paterson, N.J.

[21] Appl. No.: 192,373

[22] Filed: May 10, 1988

[51] Int. Cl.$^5$ .................. H01G 4/22; H01G 13/00
[52] U.S. Cl. .................. 361/315; 29/25.42; 252/579
[58] Field of Search ............... 29/25.42; 252/567, 570, 252/574, 578, 579; 361/311, 312, 313, 314, 315, 316, 317, 318, 323

[56] References Cited

U.S. PATENT DOCUMENTS

| | | | |
|---|---|---|---|
| 2,327,372 | 8/1943 | Ruben | 361/314 X |
| 3,214,657 | 10/1965 | Davis | 361/273 |
| 3,833,978 | 9/1974 | Eustance | 29/25.42 |
| 4,037,298 | 7/1977 | Flanagan et al. | 29/25.42 |
| 4,305,111 | 12/1981 | Förster | 361/273 |
| 4,317,158 | 2/1982 | Dequasie | 361/272 |
| 4,317,159 | 2/1982 | Dequasie | 361/318 |
| 4,327,395 | 4/1982 | Yagitani et al. | 361/314 X |
| 4,422,962 | 12/1983 | Cichanowski | 252/73 X |
| 4,459,637 | 7/1984 | Shedigian | 361/323 X |
| 4,536,331 | 8/1985 | Shedigian | 252/579 |
| 4,538,208 | 8/1985 | Shedigian | 361/319 |
| 4,542,731 | 2/1987 | Shedigian | 361/319 |
| 4,580,189 | 4/1986 | Dequasie et al. | 361/272 |

OTHER PUBLICATIONS

"On the Prevention of the Capacitance Loss of MPP Capacitors," Nishiki Research Laboratory, Kureha Chemical Industry Co., Ltd., 1986.

Primary Examiner—Donald A. Griffin
Attorney, Agent, or Firm—Darby & Darby

[57] ABSTRACT

A zinc metallized film capacitor includes a dielectric fluid comprising epoxidized soybean oil having at least one epoxy group per molecule, preferably four epoxy groups per molecule. Utilizing epoxidized soybean oil with zinc metallization results in a substantial performance improvement under high temperature and high voltage conditions, providing a zinc metallized film capacitor of reduced size and cost. In addition, the epoxidized soybean oil is relatively non-toxic, reducing environmental concerns.

7 Claims, 1 Drawing Sheet

DIELECTRIC FLUID FOR A METALLIZED FILM CAPACITOR

TECHNICAL FIELD

This invention relates to dielectric fluids for zinc or zinc alloy metallized film capacitors.

BACKGROUND

Generally, metallized film capacitors comprise two tightly wound sheets, wrapped around a core, with each sheet including a metallized layer on one side, with the metallization absent from two oppositely disposed margin layers. The opposite ends of the rolled capacitor are sprayed with a conductive metal which bonds with the sheet having a metallized end with leads attached to form the electrodes. The wound roll is usually surrounded by a dielectric fluid, with some impregnation occurring through the wound ends. Metallized film capacitors differ in the degree of impregnation from paper capacitors, because of the tightness of the winding and the lack of porosity of the film. While metallized film capacitors are preferred due to reduced labor requirements as opposed to paper or soggy foil capacitors, they have limited usefulness at higher voltages due to metal degradation.

Aliphatic or aromatic esters have been disclosed for use as dielectric capacitor impregnants, with the aromatic esters preferred in many applications. However, the aromatic esters have the disadvantage of exhibiting a high power factor at elevated temperatures, and suffer from degradation through hydrolysis. Various attempts have been made to overcome these disadvantages. In U.S. Pat. Ser. No. 3,754,173 to Eustance, an epoxide stabilized liquid aromatic ester is disclosed for use as an electrical capacitor impregnant in a paper or soggy foil capacitor, with the preferred ester being di(2-ethylhexyl) phthalate or DOP. The epoxide stabilizer increases the high temperature life of the capacitor by interacting with those chemical compounds found in or generated during operation, preventing those compounds from degrading the metallization. However, even stabilized by epoxides, metallized AC capacitors encased with aliphatic or aromatic esters continue to show a capacitance loss on life testing, which may be caused by corona, water, residual catalysts in the film, or incomplete impregnation of the wound section.

In U.S. Pat. Ser. No. 4,317,159 to Dequasie, a dielectric fluid is disclosed including 1-20% by weight of an aliphatic or aromatic isocyanate. While capacitance retention and life is increased, the presence and use of isocyanate compounds in the dielectric fluid involves environmental and safety risks due to the hazardous nature of these materials.

In U.S. Pat. Ser. No. 4,422,962 to Ciohanowsky, propylene glycol dielectric fluid is disclosed for impregnating metallized capacitors. In column 5, there is disclosed a comparison of epoxidized soybean oil with an aluminum metallized capacitor, showing capacitance changes of 5.2 and 4.1%. Such a comparison would lead one skilled in the art away from epoxidized soybean oil as a sole impregnant, as further illustrated in U.S. Pat. Ser. No. 4,642,731 to Shedigian, where glyceryl triacetate is mixed with epoxidized soybean oil. Shedigian states "that, the capacitance loss factor of epoxidized soybean oil is known to be considerably higher than that of glyceryl triacetate, for example 4.2% vs. 2.1% . . ." However, none of the references discuss capacitance loss in zinc or zinc alloy metallized capacitors, or note any differentiation between metallizations.

Consequently, the search continues for a high performance dielectric fluids for use in zinc or zinc alloy metallized capacitors which allows their utilization at higher voltages than previously achieved, providing enhanced performance, stability and life, while reducing environmental risks.

SUMMARY OF INVENTION

According to the present invention, a zinc or zinc alloy metallized film capacitor includes an epoxidized soybean oil as the dielectric fluid. While the epoxidized soybean oil may be mixed with other dielectric materials, 100% epoxidized soybean oil is preferred.

Utilizing epoxidized soybean oil provides such a significant increase in capacitor performance over the results achieved by the prior art that one skilled in the art would find the results quite surprising. In addition, such a material is environmentally safe and may be handled without using extensive precautions. Consequently, the disclosure of this invention advances the art of zinc or zinc alloy metallized film capacitors by allowing their use in higher voltage applications, with an environmentally compatible dielectric fluid.

DESCRIPTION OF THE INVENTION

Figure 1:
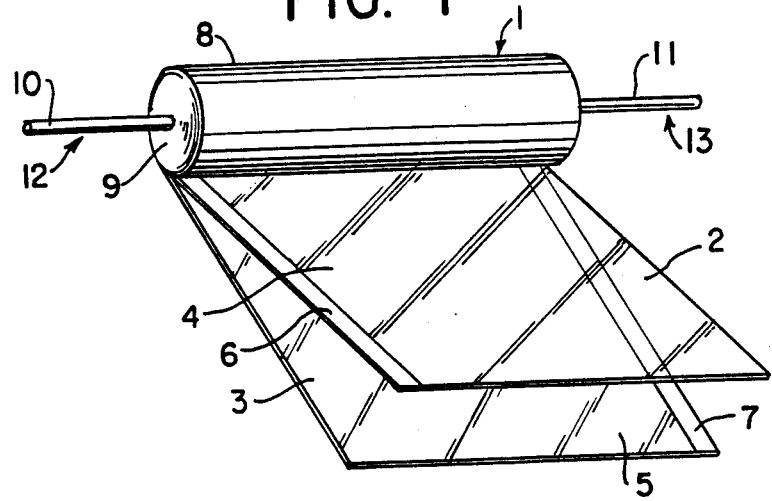
FIG. 1 is a sectional view of a zinc metallized polypropylene capacitor, shown partially unwound.

Referring to FIG. 1, a metallized film capacitor 1 is shown. Metallized capacitors are more sensitive to the presence of impurities than impregnatable capacitors, as impurities such as water may react with the metallization, converting the metal to an oxide which is an insulator, resulting in extensive capacitance loss. While the preferred metallization is zinc, other metallization known in the art, such as zinc-copper, zinc-aluminum or alloys, may also be used. The preferred film is polypropylene, but Mylar or polycarbonate dielectric films may also be used.

Referring still to FIG. 1, the capacitor 1 is composed of two sheets of polypropylene, 2 and 3 respectively, each sheet having a zinc metallized layer on one side thereof, 4 and 5 respectively. The metallized layers are separated by the unmetallized sides of each film. Each sheet includes an unmetallized margin, 6 and 7, which are oppositely positioned during winding of the sheets around a core (not shown), forming a wound section 8. The metallized end of each sheet is therefore available for lead contact at only one edge of the winding. After tightly winding the sheets around the core, the ends of the wound section 8 are covered with a conductive metallic spray 9, and leads 10 and 11 are connected thereto to form electrodes 12 and 13.

The wound section 8 is then surrounded with the dielectric fluid of the present invention, preferably by vacuum impregnation methods known within the capacitor art. While such impregnation is attempted, it is not believed that total impregnation is achieved, due to the tightness of the winding and the lack of permeability of the film. However, the fluid is believed to infiltrate the end windings to some degree.

Capacitance retention and high temperature life characteristics of zinc or zinc alloy metallized film capacitors have been found to be improved through the use of a dielectric fluid comprising epoxidized soybean oil. While the exact mechanisms are not well understood, it is believed that impurities are scavenged by the epoxides at the critical terminal ends, reducing degradation of the metallization and increasing capacitor life.

The dielectric fluid of the present invention therefore comprises an epoxidized soybean oil such as PARAPLEX G-60, produced by the C.P. Hall Co., Chicago, Ill.. While such an epoxidized soybean oil is exemplary, other epoxidized soybean oils usable with the present invention may be generally characterized by having one or more epoxy radicals per molecule, preferably having 2-5 and most preferably having 4 epoxy radicals per molecule. The degree of epoxidation is dependent on the processing techniques known within the art.

Soybean oil is generally composed of the triglycerides of oleic acid (about 26%), linoleic acid (about 49%), linolenic acid (about 11%) and saturated acids (about 14%). Epoxidation occurs at the unsaturated sites, resulting in triglyceride molecules having from about 1-9 epoxy groups per molecule. Preferably, between 2-6 epoxy radicals per molecule, and more preferably, 4 epoxy radicals per molecule.

While 100% epoxidized soybean oil is preferred, mixtures with other materials such as aromatic esters may also be used. For example, a mixture with di(2-ethyl hexyl)phthalate, better known as dioctyl phthalate (DOP), may also be used, for example in a 50/50 mixture. Other aromatic esters usable with this invention are diisononyl phthalate (DINP), dioxyl sebacate (DIOS), diisodekyl phthalate (DIDP), dimethyl phthalate (DMP), and diethyl phthalate (DED).

The performance enhancement achieved with the epoxidized soybean oil was demonstrated in life tests at 500 volts and 100° C. Referring to the Table, data is shown for four sets of zinc metallized capacitors, with a plot of the results shown in FIG. 2. The dissipation factor, df, illustrates the amount of energy converted to heat.

radicals per molecule. Both sets used a zinc metallized polypropylene film.

Figure 2:
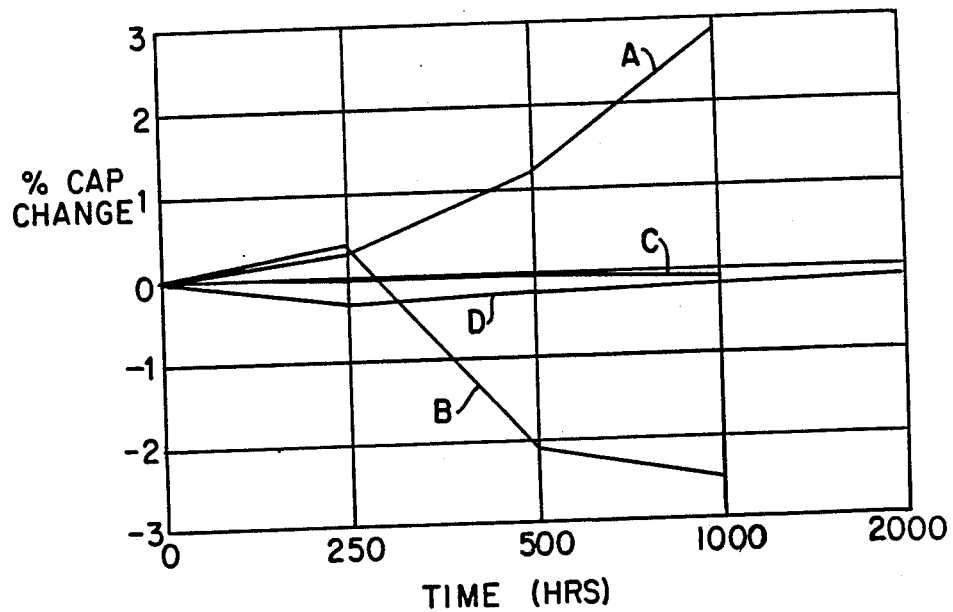
FIG. 2 is a graph illustrating capacitance change versus time for a 10 uf/8u zinc metallized polypropylene capacitor.

As seen from FIG. 2, the capacitors containing epoxidized soybean oil experienced capacitance changes of about 0.1–0.15%, with no failures through 1000 (C) and 2000 (D) hours, respectively. The capacitance sets with 2% epoxide stabilizer experienced failures at 593 and 1088 hours, requiring test termination. The epoxidized soybean oil combined with zinc or zinc alloy metallization provides a synergism which substantially improves capacitance retention and life characteristics without adverse effects on other electrical properties, significantly increasing the life beyond that expected in light of the prior disclosure and usage. In comparison with the prior art use of epoxidized soybean oil, it is seen that performance with zinc or zinc alloy metallization is quite superior to the results achieved with aluminum metallization, and one skilled in the art would be surprised by the substantial improvement.

The enhanced performance achieved by the present invention results in an increased voltage tolerance of the zinc metallized film capacitor. Previously, about 40 volts per micron was the accepted standard for metallized film capacitors. However, using epoxidized soybean oil increases the voltage tolerance to about 50 volts per micron, allowing the use of thinner gauge capacitor materials for a given voltage in a capacitor, resulting in a smaller size and thus lower cost unit. For instance, a 35 uf/280 volt AC capacitor previously required a 8 micron metallized polypropylene film. Utilizing the present dielectric fluid allows the use of a 6 micron metallized polypropylene with a 9% reduction in cost, while providing equivalent performance. In a 10 uf/280 volt AC capacitor, similar design changes have resulted in a 10% reduction in cost. Consequently, utilizing the present invention substantially increases the utility of metallized film capacitors through increased performance with reduced unit cost. In addition, epoxidized soybean oil is relatively non-toxic compared to other capacitor additives, such as isocyanates, reducing risks should leakage occur.

While this invention has been described in relation to

|  | Units Tested | TEST Temp/ TEST Volt | Hours | AVG. CAP CHANGE (%) Avg. Chg. | (PPM @ / KHZ) Avg. Df. | FAILURES Fails |
|---|---|---|---|---|---|---|
| Phthalate Ester Plus 2% Epoxide | 6 | 100/500 | 0000 | 0.0000 | 2600.67 | 0 |
|  |  |  | 0302 | 0.3907 | 2958.17 | 0 |
|  |  |  | 0593 | −2.1658 | 4197.50 | 2 |
|  |  |  | 0748 | −2.3213 | 4347.00 | 2 |
| Epoxidized Soybean Oil | 6 | 100/500 | 0000 | 0.0000 | 2108.33 | 0 |
|  |  |  | 0334 | −0.3085 | 2191.33 | 0 |
|  |  |  | 0582 | −0.1875 | 2170.17 | 0 |
|  |  |  | 1041 | −0.1825 | 2220.67 | 0 |
|  |  |  | 1696 | −0.1427 | 2286.33 | 0 |
| Phthalate Ester Plus 2% Epoxide | 6 | 100/500 | 0000 | 0.0000 | 2142.67 | 0 |
|  |  |  | 0243 | 0.3048 | 2580.50 | 0 |
|  |  |  | 0566 | 1.2902 | 2543.50 | 0 |
|  |  |  | 1088 | 2.8860 | 2836.50 | 4 |
| Epoxidized Soybean Oil | 6 | 100/500 | 0000 | 0.0000 | 2288.33 | 0 |
|  |  |  | 0574 | 0.0208 | 2220.50 | 0 |
|  |  |  | 1019 | 0.0923 | 2305.00 | 0 |

Referring to FIG. 2, the capacitance change versus time for a 24 uf/400 VAC metallized polypropylene capacitor is shown. Two sets of capacitors containing DOP with 2.0% epoxide (lines A and B) were tested against two sets of capacitors containing 100% epoxidized soybean oil (lines C and D), containing 4 epoxy zinc metallized polypropylene-containing capacitor, it will be understood by those skilled in the art that this invention may be utilized with any zinc or zinc alloy metallized film capacitor which requires increased performance with reduced product cost. It will also be understood by those skilled in the art that various changes can be made to the metallized film capacitor without varying from the scope of the present invention.

Having thus described the invention, what is claimed is:

1. A zinc or zinc alloy metallized film capacitor including a dielectric fluid comprising epoxidized soybean oil having at least one epoxy group per molecule and an aromatic ester dielectric, the epoxidized soybean oil mixed with from 1 to 50% of the aromatic ester dielectric from the group consisting essentially of di(2-ethylhexyl) phthalate, diisononyl phthalate, dioxyl sebacate, diisodecyl phthalate, dimethyl phthalate, and diethy phthalate.

2. The metallized film capacitor of claim 1 wherein the epoxidized soybean oil includes form 1-9 epoxy groups per molecule.

3. The metallized film capacitor of claim 1 wherein the epoxidized soybean oil includes 4 epoxy groups per molecule.

4. The metallized film capacitor of claim 1 wherein the capacitor is metallized with a material from the group consisting essentially of zinc, zinc-copper, zinc-aluminum or alloys thereof.

5. The metallized film capacitor of claim 1 wherein the epoxidized soybean oil is mixed with di(2-ethylhexyl) phthalate.

6. The metallized film capacitor of claim 1 wherein the film is from the group consisting essentially of polypropylene and Mylar.

7. The metallized film capacitor of claim 6 wherein the film is polypropylene.

* * * * *